No. 773,336. PATENTED OCT. 25, 1904.
C. H. NYSTROM.
FRICTION CLUTCH.
APPLICATION FILED MAR. 3, 1904.
NO MODEL.
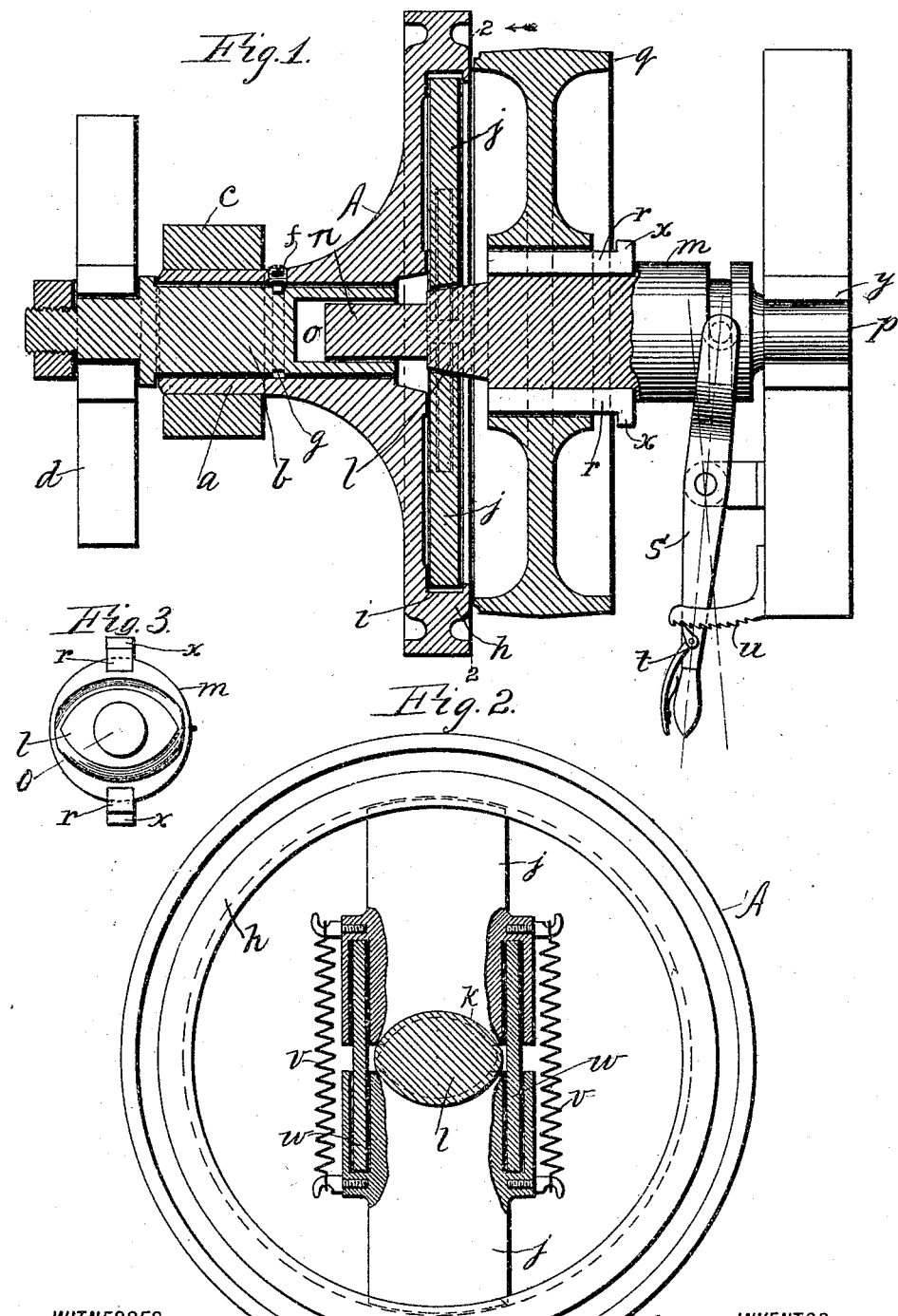

No. 773,336. Patented October 25, 1904.

UNITED STATES PATENT OFFICE.

CARL H. NYSTROM, OF YONKERS, NEW YORK.

FRICTION-CLUTCH.

SPECIFICATION forming part of Letters Patent No. 773,336, dated October 25, 1904.

Application filed March 3, 1904. Serial No. 196,313. (No model.)

*To all whom it may concern:*

Be it known that I, CARL H. NYSTROM, a citizen of the United States of America, and a resident of Yonkers, county of Westchester, and State of New York, have invented certain new and useful Improvements in Friction-Clutches, of which the following is a specification.

My invention relates to improvements in friction-clutches, and is designed to provide such clutches in simple, cheap, and reliable construction, as hereinafter described, reference being made to the accompanying drawings, in which—

Figure 1 is partly a section in the plane of the shaft and partly a side view. Fig. 2 is a transverse section on line 2 2 of Fig. 1 with details of the gripping-jaws in section. Fig. 3 is a detail showing an end view of the shaft.

A represents a rotatory disk mounted on a fixed stud-pivot $b$ and having a pulley $c$ for being rotated by a belt, said stud having suitable projection from a suitable supporting-frame $d$ for securing and carrying the disk, and said disk having an extended hub $a$ for affording substantial bearing for it with a tap-stud $f$, inserted through one side of the hub into an annular groove $g$ of the stud-pivot $b$ to retain the disk on said stud-pivot.

The disk A has a lateral flange $h$ at the periphery, which is preferably slightly grooved on the inside, as shown at $i$, in which a pair of radially-disposed gripping-jaws $j$ are arranged with their outer ends in suitable relation to the inner face of flange $h$ for being thrust against said inner face to grip thereon in frictional contact. The inner ends of said jaws are formed with an approximately but somewhat less than a half-circular notch $k$ in each, which notches are tapered also transversely of the jaws, as shown in Fig. 1, in suitable relation with a taper elliptical section $l$ of a short shaft $m$, mounted by a journal $n$, extending from the small end of said section $l$ into a socket $o$ of one end of stud-pivot $b$, and a journal $p$ of the other end having any suitable bearing $y$, so that said shaft can shift lengthwise within certain limits.

A pulley $q$ is mounted on shaft $m$ by feather-keys $r$, so that the shaft can shift lengthwise in the pulley, and a forked shifting-lever $s$ or other approved device for so shifting the shaft while in motion is provided, said lever having a latch $t$ and a rack $u$ to hold it while maintaining the operative condition of the clutch, which is effected by the outward thrust of jaws $j$ by the taper section $l$ when the handle of lever $s$ is shifted to the right, at the same time the elliptic form of section $l$ and corresponding shape of the notches $k$ lock the shaft in the jaws for causing rotation of pulley $q$ with the disk.

Springs $v$ are employed in connection with the jaws $j$ for retracting them when the thrust of section $l$ is relaxed to release the frictional grip and stop the rotation of pulley $q$.

The jaws are coupled with dowel-pins $w$, inserted in suitable sockets in the meeting ends thereof to coact with the control of the outer ends of the jaws in the groove $i$ for maintaining the proper working positions of the jaws.

The keys $r$ may have a head $x$ to limit the lateral shift of the pulley $q$ to the right on shaft $m$. The flange $h$ of the disk prevents it from shifting the other way.

It may be noted that the lateral shift of the slidable shaft is so short that the sliding of the shaft in the pulley may not be required with suitable clearance between the pulley and the disk to avoid conflict.

What I claim as my invention is—

1. The combination with a rotatory disk A, having a lateral peripheral flange, of the laterally-slidable shaft axially coincident with the axis of the disk and located on the flanged side of said disk, a taper elliptical section of said shaft in the circumferential plane of the flange of the disk, radial gripping-jaws located in the same plane, and adapted to be thrust into frictional contact with the disk-flange by the lateral thrust of the slidable shaft, means for shifting said shaft and maintaining it in the shifted position, means for retracting the jaws and means for transmitting motion from the slidable shaft.

2. The combination with a rotatory disk A, having a lateral peripheral flange, and mounted on a fixed pivot-stud, a laterally-slidable shaft axially coincident with the axis of the disk and located on the flanged side of the disk with one end journaled in a socket of the disk-carrying stud and the other end journaled in any suitable bearing, a taper elliptical section of said shaft in the circumferential plane of the flange of the disk, radial elliptically and taper notched gripping-jaws located in the same plane and adapted to be thrust into frictional contact with the disk-flange by the lateral thrust of the slidable shaft, means for shifting said shaft and maintaining it in the shifted position, means for retracting the jaws and means for transmitting motion from the slidable shaft.

Signed at New York this 26th day of February, 1904.

CARL H. NYSTROM.

Witnesses:
C. SEDGWICK,
J. M. HOWARD.